Oct. 13, 1970     H. R. WARD     3,533,154

PROCESS FOR SEPARATING RUBBER AND PLASTIC FROM METAL BUSHINGS

Filed March 17, 1969

INVENTOR.
HOWARD R. WARD
BY
ATTORNEY

# United States Patent Office 3,533,154
Patented Oct. 13, 1970

3,533,154
PROCESS FOR SEPARATING RUBBER AND PLASTIC FROM METAL BUSHINGS
Howard R. Ward, 300 W. Poe Road,
Bowling Green, Ohio 43402
Continuation-in-part of application Ser. No. 574,554,
Aug. 24, 1966. This application Mar. 17, 1969,
Ser. No. 807,874
Int. Cl. B23p 19/02
U.S. Cl. 29—427                              6 Claims

ABSTRACT OF THE DISCLOSURE

A process for separating rubber and/or plastics from ferrous and/or nonferrous metal assemblies by heating the assemblies for less than about twenty minutes in an oil maintained at a temperature below the melting or deterioration point of the rubber and plastics in the continuous presence of dispersed water molecules to form an emulsion, and then mechanically removing the metal from the rubber or plastics after the heated assemblies are removed from the bath.

RELATED APPLICATIONS

This application is a continuation-in-part of Ward's U.S. Patent application Ser. No. 574,554 filed Aug. 24, 1966, now abandoned, and is an improvement in the process disclosed in Brandeberry's U.S. Pat. No. 3,237,294 issued Mar. 1, 1966.

BACKGROUND OF THE INVENTION

With the advent of the modern engines and equipment of innumerable types and shapes, innumerable quantities of what is commonly known as "resilient bushings" are used. Resilient bushings comprise at least two (2) pieces of metal separated by a rubber and/or an elastic plastic product commonly referred to as an "insert" which may be bonded to the metal. In the majority of cases the "insert" is cylindrical. The outer surface of the metal piece can be of innumerable shapes although generally the interior of the outer piece is also cylindrical. The primary purpose of the "resilient bushings" is to absorb shock and/or vibration as well as to resume and/or maintain the alignment required. Also, these parts are made and/or assembled under high pressure.

In most cases a high degree of accuracy is required in making these parts, thus there is a large percentage of what is commonly referred to as "rejects" i.e. parts in which required specifications or tolerances have been exceeded. Usually, one or both of the metal parts are "case hardened" where a ferrous metal is used, and such parts are generally phosphorous coated.

Due to the ever increasing cost of metal and the machining generally required on at least one of the parts, it is most advantageous to recover the metal.

Numerous methods have been tried, the most popular being the use of induction heating to soften or liquify the rubber or elastic part of the assembly. This method not only requires expensive equipment and is costly, but it takes the "temper" out of the metal parts in the case of ferrous metals, and it cannot be used on nonferrous metals as it distorts their shape.

All known methods injure and/or remove the phosphorous or other coating used, and leave a residue of the rubber or plastic product on the metal, thus requiring it to be cleaned before it is reused or reassembled, which further increases the cost of recovery.

Since most manufacturers of these bushings or bonded parts use both ferrous and non-ferrous metal, it is most advantageous to have a simple, economical and practical method of being able to separate the rubber or plastic insert and/or its bond from the metal parts in a way that will allow the immediate reuse of the metal parts.

Resilient bushings are well known in the art, and they vary considerably in size from very small ones of less than an ounce in weight to those of many pounds in weight.

The structure of these bushings is substantially the same, consisting of an inner shell or core, the rubber or plastic product insert, and the outer shell or case.

As to the assembly of the resilient bushings, reference is made to United States Patent to Myers No. 2,877,543 dated Mar. 17, 1959.

The extreme high pressure necessary to make these parts causes several forms of deformities, among which is the cracking of the rubber or plastic, the non-alignment or variation of the inner core and outer shell, and an unequal extension of the rubber or plastic as may be required or specified.

SUMMARY OF THE INVENTION

It has been discoverd unexpectedly that a hot oil bath and water weakens and destroys rubber and plastic bonded to and between metal parts several times faster and more efficiently than just a hot oil bath alone. Accordingly the process of this invention comprises inserting metal and rubber and/or plastic assemblies in a heated oil bath at a temperature above about 175° F. and below about the melting point or deterioration point of the rubber and/or plastic for a period of time from a few seconds to less than about twenty minutes in the continuous presence of water molecules, either in the form of water or vapor depending upon the pressure and temperature, which water is continuously dispersed in the oil to form an emulsion. This bath may be open to the atmosphere under which conditions a small amount of water is continuously supplied thereto through diffusers at the bottom of the bath, or it may be carried out under pressure with water wherein any excess water in the oil is discharged through a blow-off device. After the plastic and/or rubber is sufficiently softened by this process, the assemblies or parts are removed from the bath and the metal is mechanically and easily separated from the rubber and plastic, such as in a press.

BRIEF DESCRIPTION OF THE VIEWS

The above mentioned and other features, objects, and advantages, and a manner of attaining them are described more specifically below by reference to embodiments of this invention shown in the accompanying drawings, wherein.

DETAILED DESCRIPTION OF PREFERRED EMBODIMENTS

Figure 1:
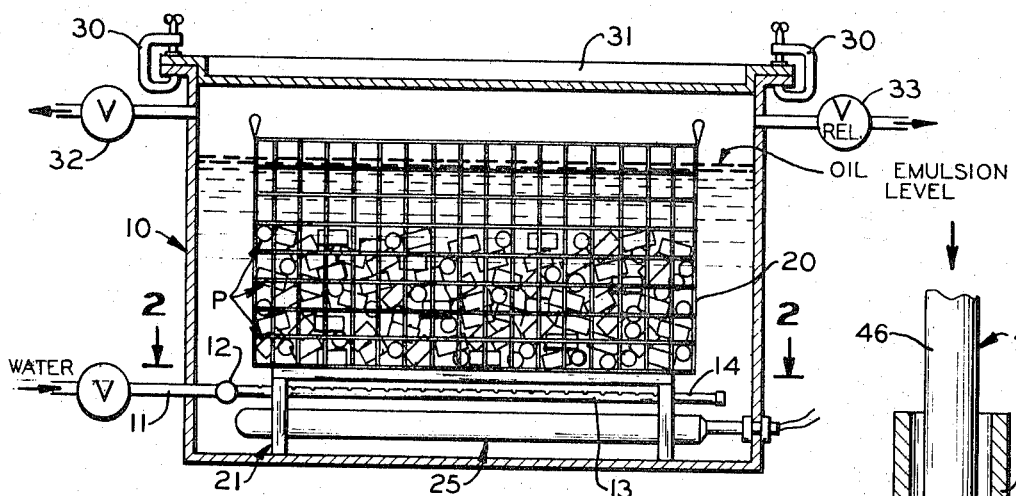
FIG. 1 is a schematic vertical sectional view of a tank for heating the assemblies in accordance with two embodiments of the process of this invention.

The equipment for separating the resilient or plastic part from the metal part includes a tank and/or container 10 for oil that has an inlet 11 for water molecules, liquid or vapor. This water inlet preferably includes a distribution system in the bottom of the tank 10 comprising a manifold 12 with branch ducts 13 having a series of small holes 14 therein for dispersing the water particles or molecules through the oil in the tank 10 and thereby to form an emulsion with this oil.

The tank 10 should contain sufficient oil to completely cover the quantity of the parts and/or assemblies P to be placed therein, such as in a wire or perforated metal basket or container 20, which may be supported on a frame or stand 21 located in the bottom of the tank 10. Any type of oil can be used; that is: mineral, vegetable, or animal.

The oil should be preheated by a heater 25, such as gas or electric, located in the bottom of the tank, which heats the emulsion in the tank to a temperature between about 175° and the melting or deterioration point of the rubber or plastic, and preferably between about 200° and 300° F. A lower temperature may be employed when a pressure type container is used, such as when clamps 30 are employed for a cover 31 on the tank 10, and the valve 32 is closed. When the tank 10 is pressurized, a pressure safety blow-off device or relief valve 33 is required to prevent explosions.

The parts and/or assemblies P may be placed directly in the tank 10, although the best and fastest results are obtained by preheating either or both the oil and the parts.

There may be then injected continuously a small amount of water through the inlet 11 into the oil bath to produce an oil-water bath which can form an emulsion.

The best results are obtained in an open tank 10 when a constant flow of water is provided through the inlet 11 at the approximate rate of one to three liquid ounces per minute, per two gallons of oil used.

Although a larger quantity of water may be used, an excess produces a hazard, in that the resulting reaction and/or turbulence of the bath may cause the boiling over of the emulsion, thus creating a fire hazard and/or injury to the party or parties standing or working near the tank 10. Such a hazard is governed by the relationship of the oil level to the heights of the sides of the container and/or tank. Another but non-hazardous result is the loss of oil.

When a pressure tank is used these hazards are eliminated. A pressure tank has certain advantages over an open tank. The period of time that is required for the parts and/ or assemblies to be left within the oil-water bath is reduced and the flow of water injected need not be regulated. In such a case, the amount of water needed to produce the desired pressure is already placed in the tank, and its amount depends upon the particular part and/or assembly to be separated and/or salvaged, and any excess water is blown off as steam through the relief valve 33. The primary disadvantage to the use of a pressure tank is that it is not readily adaptable to a continuous operation use.

The parts P should remain within the hot oil-water emulsion from a few seconds to not more than twenty (20) minutes, and preferably not more than fifteen (15) minutes depending upon the temperature of the emulsion and the size and quantity of the parts and/or assemblies to be separated.

In the use of an open tank 10 it is desirable to maintain as near a constant temperature as possible. A variance in temperature produces a variable in the time required for the parts P to be immersed within the water-oil emulsion.

The use of a hot bath of oil and water was observed to weaken or destroy the bond between the metal and the resilient or plastic part more quickly and efficiently than a bath of oil alone.

After the parts P have been immersed in the water-oil emulsion the required time, they can be separated by mechanical means. In the case of bushings and certain types of bondings, a low pressure punching operation can be used to separate the parts. In other types of bondings a prying or bending action can be used to break the bonded material from the metal. On other bonded parts a slicing arrangement can be used.

Figure 3:
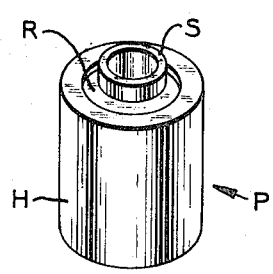
FIG. 3 is a perspective view of one type of resilient bushing which may be disassembled according to the process of this invention.

One example of a part P comprising a resilient bushing is shown in perspective in FIG. 3 having an inner metal sleeve S and an outer cylindrical tubular metal housing H, with the annular space between the parts S and H being filled with a resilient plastic or rubber material R under radial compression and/or bonded to the outer surface of the sleeve S and/or the inner surface of the housing H.

Figure 4:
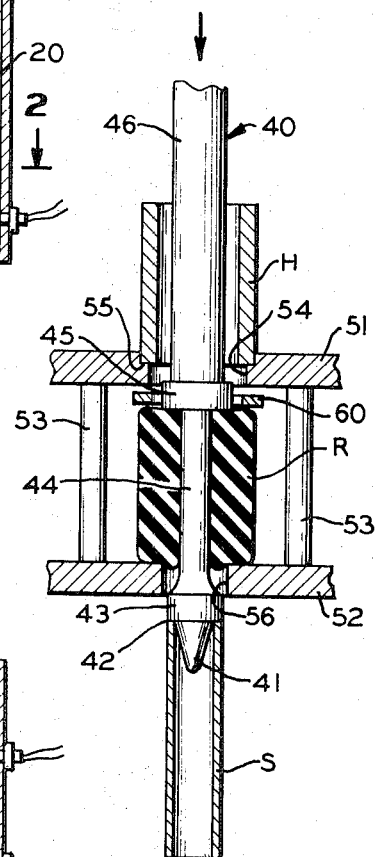
FIG. 4 is a schematic vertical section of a punch press and dies in the position of disassembling a bushing of the type shown in FIG. 3.
Figure 2:
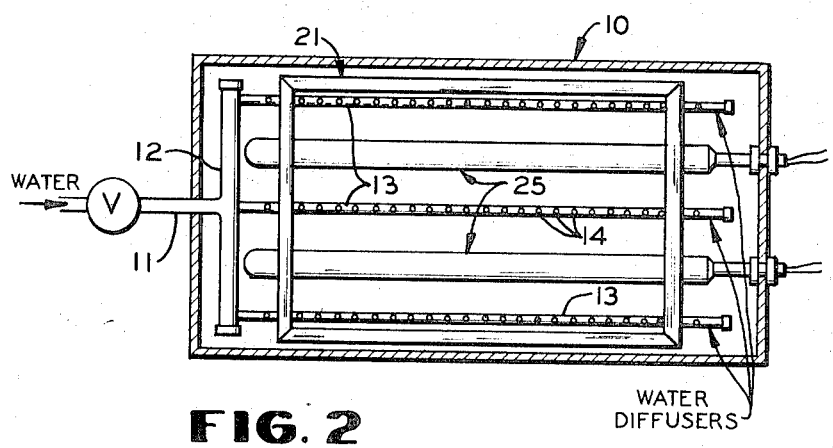
FIG. 2 is a sectional view taken along line 2—2 of FIG. 1 showing the water diffusers and heaters in the bottom of the tank shown in FIG. 1.

After the part P shown in FIG. 3 has been heat treated in a tank 10 as shown in FIGS. 1 and 2, the hot part is then placed into a press as shown in FIG. 4 comprising a punching mandrel 40 and a pair of dies 51 and 52 spaced apart by rigid posts 53. The punch 40 preferably contains a conical outer end 41, for centering in the inside of the sleeve S before the parts are separated. At the base of this conical end 41 is provided a shoulder 42 adjacent a cylindrical portion 43, which shoulder provides a seat for the end of the tubular section S. The cylindrical punch portion 43 has an outer diameter preferably slightly less than the outside diameter of the sleeve S. The length of the cylindrical punch portion 43 preferably should be as short as practical so that it will not deform the sleeve H under the pressure required to disassemble the parts. Behind this cylindrical punch portion 43, the mandrel tapers conically inwardly to a smaller diameter rod portion 44 preferably longer than the tubular section S but of a lesser diameter than the inside diameter of the sleeve S so that the plastic or rubber portion R which is under radial compression, has space to expand, as shown in FIG. 4, when the sleeve S is punched out of the bushing P. Behind the rod portion 44 is another larger flange or second cylindrical punch portion 45 which has an outer diameter preferably slightly smaller than the inner diameter of the tubular housing H for pushing the softened rubber material out of the housing H, as shown in FIG. 4. The remaining portion 46 of the punch 40 may then be the same size or slightly smaller than the second cylindrical punch portion 45.

The upper die portion 51 may be provided with an aperture 54 having a diameter preferably slightly larger than the inside diameter of the housing H and may be provided with a shoulder 55 for centering the housing H before the punch 40 has its conical end 41 enter into the other end of the sleeve S. The lower die portion 52 is provided with an aperture 56 which is slightly larger in diameter than the outside diameter of the sleeve S so that the sleeve S may be easily pushed therethrough by the operation of the punch 40.

After the parts are disassembled as shown in FIG. 4, the punch 40 may be withdrawn for punching the next part. In order to prevent the removed and softened rubber portion R from being pulled up inside of the aperture 54, a fork member 60 may be inserted around the cylindrical portion 45 of the punch 40 to bridge the gap between it and the hole 54 in the die 51 so as to strip the rubber portion R off the outer end of the punch 40 as it is retracted.

Although only one sample of a bushing and punch and dies are shown in FIGS. 3 and 4 for separating a particular shape and type part according to the process of this invention, it is to be clearly understood that other shaped parts may also be so separated by different shaped punches and dies which correspond in dimensions to the dimensions of such other shaped parts.

What is claimed is:

1. A process for disassembling resilient bushing assemblies having tubular elastic plastic inserts retained under radial compression between and including being bonded to outer rigid metal housings and inner rigid metal cores, said process comprising:
   (a) heating said assemblies in a bath of oil maintained at a temperature above about 175° F. and preferably below that of the melting and deterioration temperature of said elastic plastic inserts for a period of time from a few seconds to less than about twenty minutes in the presence of water molecules uniformly distributed throughout said bath to form an emulsion, (b) removing the resulting heated assemblies from said bath, and (c) mechanically separating said metal housings and cores from said elastic plastic inserts by applying separating forces thereto.

2. A process according to claim 1 wherein said elastic plastic inserts are bonded to said metal.

3. A process according to claim 1 wherein said temperature of said bath is maintained about 200° and 300° F.

4. A process according to claim 1 wherein said period of time for said heating is less than about fifteen minutes.

5. A process according to claim 1 wherein said heating includes the step of continuously injecting water from orifices uniformly throughout said bath in amount from between about one-half and one and a half ounces of water per minute per gallon of oil in said bath.

6. A process according to claim 1 wherein said mechanically separating comprises punching.

References Cited

UNITED STATES PATENTS

| | | | |
|---|---|---|---|
| 2,291,862 | 8/1942 | Bailey. | |
| 2,686,091 | 8/1954 | Young | 156—344 X |
| 3,237,294 | 3/1966 | Brandeberry | 29—427 |
| 3,400,443 | 9/1968 | Miller | 29—427 X |

FOREIGN PATENTS 1,277,474  10/1961  France.

CHARLIE T. MOON, Primary Examiner

U.S. Cl. X.R.

29—235; 156—344